(12) United States Patent
Kasztelan et al.

(10) Patent No.: US 6,500,330 B2
(45) Date of Patent: Dec. 31, 2002

(54) HYDROCRACKING PROCESS WITH CATALYST COMPRISING A ZEOLITE Y NOT GLOBALLY DEALUMINIZED, AN ELEMENT OF GROUP VB, AND A PROMOTER ELEMENT OF BORON, PHOSPHORUS AND SILICON

(75) Inventors: Slavik Kasztelan, Rueil Malmaison (FR); Eric Benazzi, Chatou (FR); Nathalie Marchal-George, Saint Genis Laval (FR)

(73) Assignee: Institut Francais du Petrole, Rueil-Malmaison ( * ) Notice: Subject to any disclaimer, the term of this patent is extended or adjusted under 35 U.S.C. 154(b) by 0 days.

(21) Appl. No.: 09/725,131

(22) Filed: Nov. 29, 2000

(65) Prior Publication Data

US 2001/0000006 A1 Mar. 15, 2001

Related U.S. Application Data

(62) Division of application No. 09/344,343, filed on Jun. 25, 1999.

(30) Foreign Application Priority Data

Jun. 25, 1998 (FR) .............................. 98 08050

(51) Int. Cl.⁷ .............................................. C10G 47/20
(52) U.S. Cl. ................................ 208/111.2; 208/111.3; 208/111.35
(58) Field of Search ....................... 208/111.2, 111.35, 208/111.3

(56) References Cited

U.S. PATENT DOCUMENTS

| | | | | |
|---|---|---|---|---|
| 3,671,423 A | * | 6/1972 | MacDonald et al. | 208/97 |
| 3,929,672 A | * | 12/1975 | Ward | 252/455 Z |
| 4,477,336 A | * | 10/1984 | Scherzer | 208/120 |
| 4,661,239 A | * | 4/1987 | Steigleder | 208/111 |
| 4,777,157 A | | 10/1988 | Koepke et al. | 502/66 |
| 4,801,567 A | | 1/1989 | Moorehead | 502/77 |
| 4,826,587 A | * | 5/1989 | Ward et al. | 208/111 |
| 4,855,036 A | * | 8/1989 | Chiang et al. | 208/120 |
| 4,880,521 A | * | 11/1989 | Scherzer | 208/120 |
| 4,880,787 A | * | 11/1989 | Bundens et al. | 502/65 |
| 4,910,181 A | * | 3/1990 | Angevine et al. | 502/321 |
| 5,053,374 A | * | 10/1991 | Absil et al. | 502/64 |
| 5,275,720 A | * | 1/1994 | Ward | 208/111 |
| 5,275,994 A | * | 1/1994 | Weissman et al. | 502/171 |
| 5,294,333 A | * | 3/1994 | Brysse et al. | 208/215 |
| 5,340,957 A | * | 8/1994 | Clark | 208/59 |
| 5,468,368 A | * | 11/1995 | Baker, Jr. et al. | 208/58 |
| 5,576,258 A | * | 11/1996 | Chamberlain et al. | 502/73 |
| 5,620,590 A | | 4/1997 | Absil et al. | 208/11 |
| 5,730,858 A | * | 3/1998 | Olivier et al. | 208/28 |
| 5,756,802 A | * | 5/1998 | Li et al. | 558/319 |
| 5,935,414 A | * | 8/1999 | Sonnemans et al. | 208/58 |
| 5,961,816 A | * | 10/1999 | Benazzi et al. | 208/111.3 |
| 5,972,204 A | * | 10/1999 | Corma Canos et al. | 208/114 |
| 5,997,725 A | * | 12/1999 | Benazzi et al. | 208/111.3 |
| 6,045,687 A | * | 4/2000 | Mignard et al. | 208/111.3 |
| 6,071,402 A | | 6/2000 | Danot et al. | 208/112 |

* cited by examiner

Primary Examiner—Bekir L. Yildirim
(74) Attorney, Agent, or Firm—Millen, White, Zelano & Branigan, P.C.

(57) ABSTRACT

The invention relates to a hydrocracking catalyst comprising at least one amorphous or poorly crystallized matrix of the oxide type, at least one element of group VB, preferably niobium, and at least one zeolite Y not globally dealuminized, at least one promoter element chosen from the group consisting of boron, phosphorus and silicon, optionally at least one element chosen from the elements of group VIB and group VIII, optionally at least one element of group VIIA. The invention also relates to the use of this catalyst for hydrocracking hydrocarbon feeds.

19 Claims, No Drawings

HYDROCRACKING PROCESS WITH CATALYST COMPRISING A ZEOLITE Y NOT GLOBALLY DEALUMINIZED, AN ELEMENT OF GROUP VB, AND A PROMOTER ELEMENT OF BORON, PHOSPHORUS AND SILICON

This is a divisional of application Ser. No. 09/344,343 filed Jun. 25, 1999.

The present invention relates to hydrocracking hydrocarbon feeds, with a catalyst comprising at least one amorphous or poorly crystallized matrix of the oxide type, at least one element (metal) of group VB (group 5 according to the new coding of the period classification of the elements: Handbook of Chemistry and Physics, 76th edition, 1995–1996, inside first cover page), preferably niobium, at least one zeolite Y not globally dealuminized, at least one promoter element chosen from the group consisting of boron, phosphorus and silicon, optionally at least one element (metal) chosen from group VIB and/or group VIII (group 6 and groups 8, 9 and 10 according to the new coding of the period classification of the elements), preferably molybdenum and tungsten, cobalt, nickel and iron. The catalyst also optionally comprises at least one element of group VIIA (halogen group, group 17 according to the new coding of the periodic classification of the elements), such as, for example, fluorine.

Hydrocarbon feeds, such as petroleum cuts, cuts produced from coal containing aromatic and/or olefinic and/or naphthenic and/or paraffinic compounds, the said feeds optionally comprising metals, and/or nitrogen, and/or oxygen, and/or sulphur can be beneficially hydrocracked according to the invention.

Hydrocracking of heavy petroleum cuts is a very important process in refining with which, starting from excess heavy feeds of low value, lighter fractions such as gasolines, jet fuels and light gas oils can be produced, which the refiner requires in order to adapt his production to the demand structure. Some hydrocracking processes also allow production of a highly purified residue which can constitute excellent bases for oils. In contrast to catalytic cracking, the advantage of catalytic hydrocracking is that middle distillates, jet fuels and gas oils of very good quality are provided. The gasoline produced has an octane index much lower than that produced from catalytic cracking.

The catalysts used in hydrocracking are all of the bifunctional type combining an acid function and a hydrogenating function. The acid function is carried by supports of large surface area (generally 150 to 800 $m^2.g^{-1}$) having a superficial acidity, such as halogenated (in particular chlorinated or fluorinated) aluminas, combinations of oxides of boron and aluminium, amorphous silica-aluminas and clays. The hydrogenating function is carried either by one or more metals of group VIII of the periodic classification of the elements, such as iron, cobalt, nickel, ruthenium, rhodium, palladium, osmium, iridium and platinum, or by a combination of at least one metal of group VI of the periodic classification, such as molybdenum and tungsten, and at least one metal of group VIII.

The equilibrium between the two acid and hydrogenating functions is the fundamental parameter which regulates the activity and selectivity of the catalyst. A weak acid function and a strong hydrogenating function give catalysts of low activity working in general at an elevated temperature (greater than or equal to 390° C.) and a low hourly volume velocity (the HVV, expressed in volume of feed to be treated per unit volume of catalyst and per hour, is generally less than or equal to 2), but having a very good selectivity in middle distillates. Conversely, a strong acid function and a low hydrogenating function give catalysts which are active but have less good selectivities in middle distillates. The search for a suitable catalyst will therefore be centred on a judicial choice of each of the functions to adjust the catalyst activity/selectivity relationship.

It is thus one of the great advantages of hydrocracking to have a high flexibility at various levels: flexibility at the level of the catalysts used, which leads to a flexibility in the feedes to be treated, and at the level of the products obtained. A parameter which is easy to control is the acidity of the catalyst support.

The conventional catalysts of catalytic hydrocracking are in the great majority made up of weakly acid supports, such as amorphous silica-aluminas, for example. These systems are more particularly used to produce middle distillates of very good quality, and also, if their acidity is very weak, oil bases.

Among the supports of little acidity is found the family of amorphous silica-aluminas. Many catalysts on the hydrocracking market are based on silica-alumina combined either with a metal of group VIII or, preferably, if the contents of heteroatomic poisons in the feed to be treated exceed 0.5% by weight, a combination of sulphides of metals of groups VIB and VIII. These systems have a very good selectivity in middle distillates, and the products formed are of good quality. The less acid catalysts among these can also produce lubricant bases. The disadvantage of all these catalytic systems based on an amorphous support is, as has been said, their low activity.

On the other hand, simple sulphides of elements of group VB have been described as constituents of catalysts for hydrorefining hydrocarbon feeds, such as, for example, niobium trisulphide in the patent U.S. Pat. No. 5,294,333. Mixtures of simple sulphides comprising at least one element of group VB and an element of group VIB have also been tested as constituents of catalysts for hydrorefining hydrocarbon feedes, such as, for example, in the patent U.S. Pat. No. 4,910,181 or the patent U.S. Pat. No. 5,275,994.

Research work carried out on zeolites and on the active hydrogenating phases led surprisingly to the discovery of a catalyst for hydrocracking hydrocarbon feeds comprising at least one amorphous or poorly crystallized, generally porous matrix, such as alumina, at least one element of group VB of the periodic classification of the elements, such as tantalum, niobium and vanadium, preferably niobium, at least one zeolite Y not globally dealuminized and with a unit cell parameter (or crystalline parameter) greater than 2.438 nm, preferably greater than 2.442 nm, and very preferably greater than 2.455 nm, and a global SiO2/Al2O3 ratio of less than 8, preferably less than 7.5, very preferably less than 7, and at least one promoter element chosen from the group consisting of boron, phosphorus and silicon . . .

The catalyst also optionally comprises at least one element of group VIB of the said classification, such as chromium, molybdenum and tungsten, preferably molybdenum or tungsten, and more preferably molybdenum, optionally an element of group VIII, that is to say an element chosen from the group consisting of: Fe, Ru, Os, Co, Rh, Ir, Ni, Pd and Pt, preferably iron, cobalt, nickel or ruthenium, and optionally an element of group VIIA, preferably fluorine.

The catalyst has a hydrocracking activity which is greater than that of catalytic formulations based on an element of group VIB which are known from the prior art.

The catalyst of the present invention generally comprises, in % by weight with respect to the total weight of the catalyst:

0.1 to 99.8%, preferably 0.1 to 90%, more preferably 0.1 to 80%, and very preferably 0.1 to 70% of at least one zeolite Y not globally dealuminized and having a unit cell parameter which is greater than 2.438 nm, preferably greater than 2.442 nm, and very preferably greater than 2.455 nm, and a global $SiO_2/Al_2O_3$ ratio of less than 8, preferably less than 7.5, very preferably less than 7, 0.1 to 60%, preferably 0.1 to 50%, and more preferably 0.1 to 40% of at least one element chosen from group VB, 0.1 to 99%, preferably 1 to 99% of at least one amorphous or poorly crystallized porous mineral matrix of the oxide type, 0.1 to 20%, preferably 0.1 to 15%, and more preferably 0.1 to 10% of at least one promoter element chosen from the group consisting of boron, phosphorus and silicon, excluding the silicon optionally contained in the zeolite, it being possible for the catalyst also to comprise:

0 to 60%, preferably 0.1 to 50%, and more preferably 0.1 to 40% of at least one element chosen from the elements of group VIB and group VIII, and 0 to 20%, preferably 0.1 to 15%, and more preferably 0.1 to 10% of at least one element chosen from group VIIA, preferably fluorine.

If it is present, the promoter element silicon is in amorphous form and located chiefly on the matrix. The elements of group VB, VIB and of group VIII of the catalyst of the present invention can be present entirely or partly in the metallic and/or oxide and/or sulphide form.

The catalysts according to the invention can be prepared by any methods known to the man skillet in the art.

A preferred process for the preparation of the catalyst according to the present invention comprises the following stages:

a) a solid called the precursor comprising at least the following compounds is dried and weighed: at least one matrix, at least one zeolite Y not globally dealuminized, optionally at least one promoter element chosen from the group consisting of boron, phosphorus and silicon, optionally at least one element chosen from the elements of group VIB and group VIII, and optionally at least one element of group VIIA, the entire mixture preferably being shaped, b) the dry solid obtained in stage a) is calcined at a temperature of at least 150° C., preferably at least 450° C., c) the precursor solid defined in stage b) is impregnated with a solution comprising at least one element of group VB, preferably niobium, d) the moist solid is left to stand in a damp atmosphere at a temperature of between 10 and 120° C., e) the moist solid obtained in stage d) is dried at a temperature of between 60 and 150° C., f) the solid dried in stage e) is calcined in dry air at a temperature of at least 150° C., preferably at least about 250° C.

The solid obtained at the end of any one of stages a) to e) can be impregnated by at least one solution comprising all or some of at least one element chosen from the elements of group VIB and group VIII, optionally at least one promoter element chosen from the group consisting of boron, phosphorus and silicon, and optionally at least one element of group VIIA.

The preparation of the precursor of stage a) above can be carried out by any of the conventional methods of the man skilled in the art. According to a preferred preparation process, the precursor is obtained by mixing at least one matrix and at least one non-dealuminized zeolite Y and then shaping, drying, and calcining the mixture. The promoter element or elements chosen from the group consisting of boron, phosphorous, and silicon and that or those chosen from the elements of groups VIB, VIII and/or from the elements of group VIIA are then introduced by any method known to the man skilled in the art at any one of stages a) and e), before or after the shaping and before or after the calcination of the said mixture.

The shaping can be carried out, for example, by extrusion, by pelletizing, by the oil-drop method, by rotary plate granulation or by any other method well-known to the man skillet in the art. At least one calcination can be carried out after any one of the preparation stages, and it is usually carried out in air at a temperature of at least 150° C., preferably at least 300° C. The product obtained at the end of stage a) and/or of stage e) and/or optionally after introduction of the element or elements chosen from the elements of groups VIB, VIII, and/or from the promoter elements of the group consisting of boron, phosphorus and silicon, and/or from the elements of group VIIA is then thus optionally calcined in air, usually at a temperature of at least 150° C., preferably at least 250° C., more preferably between about 350 and 1,000° C.

The hydrogenating element can be introduced at any stage of the preparation, preferably during mixing, or very preferably after shaping. The shaping is followed by a calcination and the hydrogenating element is introduced before or after this calcination. In all cases, the preparation ends by a calcination at a temperature of 250 to 600° C. One of the preferred methods in the present invention comprises kneading at least one zeolite in a moist alumina gel for some minutes and then passing the paste thus obtained through a die to form extrudates with a diameter of between 0.4 and 4 mm. The hydrogenating function can then be introduced only in part (in the case, for example, of combinations of oxides of metals of groups VIB and VIII) or in total at the time of kneading of the zeolite, that is to say of at least one non-dealuminized zeolite Y, with at least one oxide gel chosen as the matrix. It can be introduced by one or more ion exchange operations on the calcined support comprising at least one zeolite dispersed in at least one matrix, with the aid of solutions comprising the precursor salts of the metals chosen, if these belong to group VIII. It can be introduced by one or more impregnation operations on the shaped and calcined support with a solution of the precursors of the oxides of metals of groups VIII (in particular cobalt and nickel) if the precursors of the oxides of metals of group VIB (in particular molybdenum or tungsten) have been introduced beforehand at the time of kneading of the support. Finally, it can be introduced by one or more impregnation operations on the calcined support comprising at least one non-dealuminized zeolite Y and at least one matrix with solutions comprising the precursors of the oxides of metals of groups VIB and/or VIII, the precursors of the oxides of metals of group VIII preferably being introduced after those of group VIB or at the same time as the latter.

Another preferred preparation process comprises introducing at least one element of group VB and at least one element chosen from the elements of group VIII and group VIB into a mixture of at least one matrix with at least one non-dealuminized zeolite Y, before or after shaping and before or after calcination of the said mixture.

Preferably, the support is impregnated with an aqueous solution. The impregnation of the support is preferably carried out by incipient wetness impregnation method well-known to the man skillet in the art. The impregnation can be carried out in a single stage with a solution comprising all the elements making up the final catalyst.

Boron and/or phosphorus and/or silicon and optionally the element chosen from group VIIA of halide ions, preferably fluorine, can be introduced into the catalyst at various stages of the preparation by any technique known to the man skilled in the art.

A method which is preferred according to the invention comprises depositing, for example by impregnation, the promoter element or elements chosen, for example the boron-silicon pair, on the calcined or non-calcined, preferably calcined, precursor. For this, an aqueous solution of at least one boron salt, such as ammonium diborate or ammonium pentaborate, is prepared in an alkaline medium in the presence of hydrogen peroxide and an impregnation, so-called in the dry state, in which the pore volume of the precursor is filled with the solution comprising boron, is carried out. In the case where silicon, for example, is deposited a solution of a silicon compound of the silicone type, for example, will be used.

The deposition of boron and silicon can also be carried out simultaneously using, for example, a solution comprising a boron salt and a silicon compound of the silicone type. Thus, for example, in the case where the precursor is a catalyst of the nickel-molybdenum type supported on alumina and zeolite chosen from the group consisting of non-dealuminized zeolites Y, it is possible to impregnate this precursor with the aqueous solution of ammonium diborate and silicone Rhodorsil E1P from the company Rhône Poulenc, to carry out a drying, for example at 80° C., and then to impregnate with a solution of ammonium fluoride, to carry out a drying, for example at 80° C., and to carry out a calcination, for example and preferably in air in a flow-through bed, for example at 500° C. for 4 hours. The element of group VB is then deposited by any method known to the man skilled in the art.

The promoter element chosen from the group formed by boron, phosphorus and silicon and the element chosen from the halogens of group VIIA can also be introduced by one or more impregnation operations, for example with excess solution, on the calcined precursor.

Thus, for example, it is possible to impregnate the precursor with an aqueous solution of ammonium diborate and/or silicone Rhodorsil E1P from the company Rhône Poulenc, to carry out a drying, for example at 80° C., and then to impregnate with a solution of ammonium fluoride, to carry out a drying, for example at 80° C., and to carry out a calcination, for example and preferably in air in a flow-through bed, for example at 500° C. for 4 hours. The element of group VB is then deposited by any method known to the man skillet in the art.

Other impregnation sequences can be used to obtain the catalyst of the present invention.

For example, it is possible to impregnate the precursor with a solution comprising one of the promoter elements (B, P, Si), to dry it and calcine it, and then to impregnate the solid obtained with the solution comprising another promoter element, and to dry it and calcine it. It is also possible to impregnate the precursor with a solution comprising two of the promoter elements, to dry it and to calcine it, and then to impregnate the solid obtained with the solution comprising another promoter element, to dry it and to carry out a final calcination. The element of group VB is then deposited by any method known to the man skillet in the art.

The catalyst of the present invention can comprise an element (metal) of group VIII, such as iron, cobalt, nickel, ruthenium, rhodium, palladium, osmium, iridium or platinum. Among the elements of group VIII, an element chosen from the group formed by iron, cobalt, nickel and ruthenium is preferably employed. Combinations of the following elements are advantageously used: nickel-niobium-molybdenum, cobalt-niobium-molybdenum, iron-niobium-molybdenum, nickel-niobium-tungsten, cobalt-niobium-tungsten and iron-niobium-tungsten, the preferred combinations being: nickel-niobium-molybdenum and cobalt-niobium-molybdenum. It is also possible to use combinations of four elements, for example nickel-cobalt-niobium-molybdenum. Combinations comprising a noble metal, such as ruthenium-niobium-molybdenum, or ruthenium-nickel-niobium-molybdenum, can also be used.

In the case where the elements are introduced in several impregnations with corresponding precursor salts, a stage of intermediate calcination of the catalyst should generally be carried out at a temperature of between 250 and 600° C. The impregnation with molybdenum can be facilitated by addition of phosphoric acid into solutions of ammonium paramolybdate, which also enables introduction of phosphorus in a manner which promotes the catalytic activity. Other compounds of phosphorus can be used, as is well-known to the man skilled in the art.

The impregnation with niobium can be facilitated by addition of oxalic acid and optionally ammonium oxalate into solutions of niobium oxalate. Other compounds can be used to improve the solubility and facilitate the impregnation of niobium, as is well-known to the man skillet in the art.

The sulphurization can be carried out by any method known to the man skilled in the art. The method preferred according to the invention comprises heating the non-calcined catalyst in a stream of a hydrogen/hydrogen sulphide mixture or in a stream of a nitrogen/hydrogen sulphide mixture, or also under pure hydrogen sulphide at a temperature of between 150 and 800° C., preferably between 250 and 600° C., generally in a flow-through bed reaction zone.

The usually amorphous or poorly crystallized porous mineral matrix in general comprises at least one refractory oxide in amorphous or poorly crystallized form. The said matrix is usually chosen from the group formed by alumina, silica, silica-alumina or a mixture of at least two of the abovementioned oxides. Aluminates can also be chosen. Matrices comprising alumina in all these forms known to the man skilled in the art, for example gamma-alumina, are preferably used.

The sources of the element of group VB which can be used are well-known to the man skillet in the art. For example, among the sources of niobium it is possible to use the oxides, such as diniobium pentoxide $Nb_2O_5$, niobium acid $Nb_2O_5.H_2O$, niobium hydroxides and polyoxoniobates, niobium alkoxides of the formula $Nb(OR_1)_3$, where $R_1$ is an alkyl radical, niobium oxalate $NbO(HC_2O_4)_5$ and ammonium niobate. Niobium oxalate or ammonium niobate is preferably used.

The non-dealuminized zeolite Y is characterized by a unit cell parameter greater than 2.438 nm, preferably greater than 2.442 nm, and very preferably greater than 2.455 nm, and a global $SiO2/Al2O3$ ratio of less than 8, preferably less than 7.5, very preferably less than 7.

Preferaby a zeolite Y not globally deluminized and also having the followin properties is used:

a molar $SiO2/Al2O3$ ratio of the skeleton greater than the global molar $SiO_2/Al_2O_3$ ratio and less than about 21

[calculated according to the so-called Fichtner-Schmittler correlation (in Cryst. Res. Techn. 1984, 19, K1)], a content of alkaline earth or alkali metals of less than 0.2% by weight, determined on the zeolite calcined at 1,100° C., a specific surface area, determined by the BET method, greater than about 400 m$^2$/g, and preferably greater than 600 m$^2$/g.

The source of sulphur can be elemental sulphur, carbon disulphide, hydrogen sulphide, sulphur hydrocarbons, such as dimethyl sulphide, dimethyl disulphide; mercaptans and thiophene compounds, thiols, polysulphides, such as, for example, ditert-nonyl polysuiphide or TPS-37 from the company ATOCBEM, and petroleum cuts rich in sulphur, such as gasoline, kerosene and as oil, by themselves or in mixtures with one of the abovementioned sulphur compounds. The preferred source of sulphur is carbon disulphide or hydrogen sulphide.

The preferred source of phosphorus is orthophosphoric acid $H_3PO_4$, but its salts and esters, such as ammuonium phosphates, are also suitable. The phosphorus can be introduced, for example, in the form of a mixture of phosphoric acid and a basic organic compound containing nitrogen, such as ammonia, primary and secondary amines, cyclic amines, compounds of the pyridine and quinoline family and compounds of the pyrrole family.

Numerous sources of silicon can be employed. It is thus possible to use ethyl orthosilicate $Si(OEt)_4$, siloxanes, polysiloxanes, silicones, silicone emulsions and halide silicates, such as ammonium fluorosilicate $(NH_4)_2SiF_6$ or sodium fluorosilicate $Na_2SiF_6$. Silicomolybdic acid and its salts and silicotungstic acid and its salts can also advantageously be employed. Silicon can be added, for example, by impregnation with ethyl silicate dissolved in a water/alcohol mixture. Silicon can also be added, for example, by impregnation with a silicon compound of the silicone type suspended in water.

The source of boron can be boric acid, preferably orthoboric acid $H_3BO_4$, ammonium diborate or pentaborate, boron oxide and boric esters. Boron can be introduced, for example, in the form of a mixture of boric acid, hydrogen peroxide and a basic organic compound containing nitrogen, such as ammonia, primary and secondary amines, cyclic amines, compounds of the pyridine and quinoline family and compounds of the pyrrole family. Boron can be introduced, for example, by means of a solution of boric acid in a water/alcohol mixture.

The sources of group VIIA elements which can be used are well-known to the man skilled in the art. For example, fluoride anions can be introduced in the form of hydrofluoric acid or its salts. These salts are formed with alkali metals, ammonium or an organic compound. In the latter case, the salt is advantageously formed in the reaction mixture by reaction between the organic compound and hydrofluoric acid. It is also possible to use hydrolysable compounds which can liberate fluoride ions in water, such as ammonium fluorosihcate $(NH_4)_2SiF_6$, silicon tetrafluoride $SiF_4$ or sodium tetrafluoride $Na_2SiF_6$. The fluorine can be introduced, for example, by impregnation with an aqueous solution of hydrofluoric acid or ammonium fluoride.

The sources of group VIB elements which can be used are well-known to the man skilled in the art. For example, among the sources of molybdenum and tungsten, it is possible to use the oxides and hydroxides, molybdic and tungstic acids and their salts, in particular the ammonium salts, such as ammonium molybdate, ammonium heptamolybdate and ammonium tungstate, phosphomolybdic acid, phosphotungstic acid and their salts, silicomolybdic acid and silicotungstic acid and their salts. The oxides and the ammonium salts, such as ammonium molybdate, ammonium heptamolybdate and ammonium tungstate, are preferably used.

The sources of group VIII elements which can be used are well-known to the man skilled in the art. For example, for the non-noble metals the nitrates, the sulphates, the phosphates, the halides, for example chlorides, bromides and fluorides, the carboxylates, for example acetates, and carbonates will be used. For the noble metals the halides, for example the chlorides, the nitrates, the acids, such as chloroplatinic acid, and the oxychlorides, such as ammoniacal ruthenium oxychloride, will be used.

The catalysts obtained by the present invention are shaped in the form of particles of different shape and dimensions. They are in general used in the form of extrudates which are cylindrical or polylobic, such as bilobic, trilobic or polylobic in straight or twisted form, but can also be produced and employed in the form of crushed powder, tablets, rings, beads or coils. They have a specific surface area, measured by adsorption of nitrogen by the BET method (Brunauer, Emmett, Teller, J. Am. Chem. Soc., vol. 60, 309–316 (1938)) of between about 50 and about 600 m$^2$/g, a pore volume, measured by mercury porosimetry, of between about 0.2 and about 1.5 cm$^3$/g, and a pore size distribution which can be monomodal, bimodal or polymodal.

The catalysts obtained by the present invention are used for hydrocracking of hydrocarbon feeds such as petroleum cuts. The feeds employed in the process are gasolines, kerosenes, gas oils, vacuum gas oils, atmospheric residues, vacuum residues, atmospheric distillates, vacuum distillates, heavy fuels, oils, waxes and paraffins, used oils, deasphalted residues or crude oils, feeds originating from thermal or catalytic conversion processes and their mixtures. They contain heteroatoms, such as sulphur, oxygen and nitrogen, and optionally metals.

The catalysts thus obtained are advantageously used for hydrocracking of, in particular, heavy hydrocarbon cuts of the type of vacuum distillates or deasphalted or hydrotreated residues or equivalents. The heavy cuts preferably comprise at least 80% by volume of compounds of which the boiling points are at least 350° C., and preferably between 350 and 580° C. (that is to say corresponding to compounds containing at least 15 to 20 carbon atoms). They generally contain heteroatoms, such as sulphur and nitrogen. The nitrogen content is usually between 1 and 5,000 ppm by weight and the sulphur content between 0.01 and 5% by weight.

The hydrocracking conditions, such as temperature, pressure, hydrogen recycling level and hourly volume velocity, can vary widely as a function of the nature of the feed, the quality of the desired products and the installations available to the refiner. The temperature is in general greater than 200° C., and preferably between 250° C. and 480° C. The pressure is greater than 0.1 MPa, and preferably greater than 1 MPa. The amount of hydrogen is at least 50, and often between 80 and 5,000 normal liters of hydrogen per liter of feed. The hourly volume velocity is in general between 0.1 and 20 volumes of feed per volume of catalyst and per hour.

The catalysts of the present invention are preferably subjected to a sulphurization treatment to convert at least a portion of the metallic species into sulphide before they are brought into contact with the feed to be treated. This activation treatment by sulphurization is well-known to the man skilled in the art and can be carried out by any method already described in the literature, either in situ, that is to say in the hydrocracking reactor, or ex situ.

A conventional sulphurization method which is well-known to the man skilled in the art comprises heating in the presence of hydrogen sulphide at a temperature of between 150 and 800° C., preferably between 250 and 600° C., in general in a flow-through bed reaction zone.

The catalyst of the process of the present invention can advantageously be employed for hydrocracking of cuts of the vacuum distillate type highly charged with sulphur and nitrogen, and more particularly, for example, cuts with a sulphur content greater than 0.1% by weight and a nitrogen content greater than 10 ppm.

In a first embodiment or partial hydrocracking, also called gentle hydrocracking, the conversion level is less than 55%. The catalyst according to the invention is then employed at a temperature in general greater than or equal to 230° C., preferably between 300° C. and 480° C., and more preferably between 350° C. and 450° C. The pressure is preferably greater than 2 MPa, more preferably 3 MPa, and preferably less than 12 MPa, more preferably less than 10 MPa. The amount of hydrogen is at least 100 normal liters of hydrogen per liter of feed, and preferably between 200 and 3,000 normal liters of hydrogen per liter of feed. The hourly volume velocity is preferably between 0.15 and 10 volumes of feed per volume of catalyst and per hour. Under these conditions, the catalysts of the present invention have a better conversion, hydrodesulphurization and hydrodenitrogenation activity than commercial catalysts.

In a second embodiment, the catalyst of the process of the present invention can be employed for partial hydrocracking, advantageously under conditions of a moderate pressure of hydrogen, of cuts for example of the vacuum-distillate type which are highly charged with sulphur and nitrogen and have been hydrotreated beforehand. In this method of hydrocracking, the conversion level is less than 55%. In this case, the petroleum cut conversion process takes place in two stages, the catalysts according to the invention being used in the second stage. The catalyst of the first stage has a hydrotreatment function and comprises a matrix preferably based on alumina, and preferably does not comprise zeolite, and at least one metal having a hydrogenating function. The said matrix is an amorphous or poorly crystallized porous mineral matrix of the oxide type. There may be mentioned by way of non-limiting example aluminas, silicas and silica-aluminas. Aluminates can also be chosen. Matrices comprising alumina in all these forms known to the man skillet in the art are preferably used, and more preferably aluminas, for example gamma-alumina. The hydrotreatment function is ensured by at least one metal or metal compound of group VIII, such as nickel and cobalt in particular. A combination of at least one metal or metal compound of group VIB (for example molybdenum or tungsten) and at least one metal or metal compound of group VIII (for example cobalt or nickel) of the periodic classification of the elements can be used. The total concentration of oxides of metals of groups VIB and VIII is preferably between 5 and 40% by weight, and more preferably between 7 and 30% by weight, and the weight ratio, expressed in oxide of metal (metals) of group VIB to oxide of metal (metals) of group VIII is preferably between 1.25 and 20, and more preferably between 2 and 10. Furthermore, this catalyst can comprise phosphorus. The phosphorus content, expressed as the concentration of diphosphorus pentoxide $P_2O_5$, will preferably be at most 15%, more preferably between 0.1 and 15% by weight, and very preferably between 0.15 and 10% by weight. It can also comprise boron in a B/P ratio of preferably between 1.05 and 2 (atomic), the total contents of boron (B) and phosphorus (P), expressed as oxides, preferably being between 5 and 15% by weight.

The first stage in general takes place at a temperature between 350 and 460° C., preferably between 360 and 450° C., a total pressure of at least 2 MPa, preferably at least 3 MPa, an hourly volume velocity of between 0.1 and 5 volumes of feed per volume of catalyst and per hour, preferably between 0.2 and 2 volumes of feed per volume of catalyst and per hour, and with an amount of hydrogen of at least 100 normal liters per liter of feed, and preferably between 260 and 3,000 normal liters per liter of feed.

For the conversion stage with the catalyst according to the invention (or second stage), the temperatures are in general greater than or equal to 230° C., and often between 300° C. and 480° C., and preferably between 300 and 450° C. The pressure is in general at least 2 MPa, and preferably at least 3 MPa. The amount of hydrogen is at least 100 normal liters of hydrogen per liter of feed, and preferably between 200 and 3,000 liters of hydrogen per liter of feed. The hourly volume velocity is preferably between 0.15 and 10 volumes of feed per volume of catalyst and per hour. Under these conditions, the catalysts of the process of the present invention have a better conversion, hydrodesulphurization and hydrodenitrogenation activity and a better selectivity in middle distillates than the commercial catalysts. The life of the catalysts is also improved in the range of moderate pressure.

In another embodiment, the catalyst of the process of the present invention can be employed for hydrocracking under elevated hydrogen pressure conditions, in general at least 5 MPa. The cuts treated are, for example, of the vacuum distillate type which are highly charged with sulphur and nitrogen and have been hydrotreated beforehand. In this hydrocracking method, the conversion level is greater than 55%. In this case, the petroleum cut conversion process takes place in two stages, the catalyst according to the invention being used in the second stage.

The catalyst of the first stage has a hydrotreatment function and comprises a matrix preferably based on alumina, and preferably not comprising zeolite, and at least one metal having a hydrogenating function. The said matrix can also comprise or contain silica, silica-alumina, boron oxide, magnesia, zirconia, titanium oxide or a combination of these oxides. The hydro-dehydrogenating function is ensured by at least one metal or metal compound of group VIII, such as nickel and cobalt in particular. A combination of at least one metal or metal compound of group VIB (for example molybdenum or tungsten) and at least one metal or metal compound of group VIII (for example cobalt or nickel) of the periodic classification of the elements can be used. The total concentration of oxides of metals of groups VIB and VIII is preferably between 5 and 40% by weight, and more preferably between 7 and 30% by weight, and the weight ratio, expressed in metallic oxide of metal (or metals) of group VIB to metal (or metals) of group VIII is preferably between 1.25 and 20, and more preferably between 2 and 10. Furthermore, this catalyst can optionally comprise phosphorus. The phosphorus content, expressed as the concentration of diphosphorus pentoxide $P_2O_5$, will 25 preferably be at most 15%, more preferably between 0.1 and 15% by weight, and very preferably between 0.15 and 10% by weight. It can also comprise boron in a B/P ratio of preferably between 1.02 and 2 (atomic), the total contents of boron (B) and phosphorus (P), expressed as oxides, being preferably between 5 and 15% by weight.

The first stage in general takes place at a temperature between 350 and 460° C., preferably between 360 and 450° C., a pressure of at least 2 MPa, preferably at least 3 MPa, an hourly volume velocity of between 0.1 and 5 volumes of feed per volume of catalyst and per hour, preferably between 0.2 and 2 volumes of feed per volume of catalyst and per hour, and with an amount of hydrogen of at least 100 normal liters of hydrogen per liter of feed, and preferably between 260 and 3,000 normal liters of hydrogen per liter of feed.

For the conversion stage with the catalyst according to the process of the invention (or second stage), the temperatures are in general greater than or equal to 230° C., often between 300° C. and 480° C., and preferably between 330° C. and 440° C. This pressure is in general greater than 5 MPa, and preferably greater than 7 MPa. The amount of hydrogen is at least 100 normal liters of hydrogen per liter of feed, and preferably between 200 and 3,000 liters of hydrogen per liter of feed. The hourly volume velocity is preferably between 0.15 and 10 volumes of feed per volume of catalyst and per hour.

Under these conditions, the catalysts of the process of the present invention have a better conversion activity than the commercial catalysts.

The following examples illustrate the present invention, but without limiting the scope.

EXAMPLE 1

Preparation of Supports Comprising a Non-dealuminized Zeolite Y

A hydrocracking catalyst support comprising a zeolite Y not globally dealuminized was produced in a large amount in order to be able to prepare various catalysts based on the same support. For this, 19.7% by weight of a non-dealuminized zeolite Y with a unit cell parameter equal to 2.453 nm and a global SiO2/Al2O3 ratio of 6.6 and a skeleton SiO2/Al2O3 ratio of 8.6 is used, and is mixed with 80.3% by weight of a matrix of ultrafine tabular boehmite or alumina gel marketed under the name SB3 by the company Condéa Chemie GmbH. This powder mixture was subsequently mixed with an aqueous solution comprising 66% nitric acid (7% by weight of acid per gram of dry gel) and then kneaded for 15 minutes. At the end of this kneading, the paste obtained is passed through a die with cylindrical orifices of a diameter equal to 1.4 mm. The extrudates are subsequently dried overnight at 120° C. and then calcined at 550° C. for 2 hours in damp air containing 7.5% by volume of water. The support Z3 is thus obtained in the form of cylindrical extrudates of 1.2 mm diameter having a specific surface area of 351 m²/g, a pore volume of 0.58 cm³/g and a monomodal pore size distribution centred on 10 mm. Analysis of the support by X-ray diffraction shows that it is composed of cubic gamma-alumina of low crystallinity and zeolite Y with a unit cell parameter of 2.444 nm and a global SiO2/Al2O3 ratio of 6.7 and a skeleton SiO2/Al2O3 ratio of 13.9.

A hydrocracking catalyst support comprising a small amount of zeolite Y not globally dealuminized was produced in a large amount in the same manner in order to be able to prepare various catalysts based on the same support. For this, 8.6% by weight of the zeolite Y described above is used, and is mixed with 91.4% by weight of a matrix composed of ultrafine tabular boehmite or alumina gel marketed under the name SB3 by the company Condéa Chemie GmbH. This powder mixture was subsequently mixed with an aqueous solution comprising 66% nitric acid (7% by weight of acid per gram of dry gel) and then kneaded for 15 minutes. At the end of this kneading, the paste obtained is passed through a die having cylindrical orifices of a diameter equal to 1.4 mm. The extrudates are subsequently dried overnight at 120° C. and then calcined at 550° C. for 2 hours in damp air containing 7.5% by volume of water. The support Z5 is thus obtained in the form of cylindrical extrudates of 1.2 mm diameter having a specific surface area of 259 m²/g, a pore volume of 0.57 cm³/g and a monomodal pore size distribution centred on 10 mm. Analysis of the support by X-ray diffraction shows that it is composed of cubic gamma-alumina of low crystallinity and zeolite Y with a unit cell parameter of 2.444 nm and a global SiO2/Al2O3 ratio of 6.7 and a skeleton SiO2/Al2O3 ratio of 14.1.

EXAMPLE 2

Preparation of Hydrocracking Catalysts Comprising a Non-dealuminized Zeolite Y (Not According to the Invention)

The extrudates of support Z3 of example 1 are impregnated in the dry state with an aqueous solution of a mixture of ammonium heptamolybdate and nickel nitrate, dried overnight at 120° C. in air and finally calcined in air at 550° C. The weight contents of the catalyst NiMo3 which are obtained are indicated in table 1. The catalyst NiMo3 contains, in particular, 16.6% by weight of zeolite Y. Analysis of the support by X-ray diffraction shows that it is composed of cubic gamma-alumina of low crystallinity and zeolite Y with a unit cell parameter of 2.444 nm and a global SiO2/Al2O3 ratio of 6.6 and a skeleton SiO2/Al2O3 ratio of 14.2.

The catalyst NiMo3 was then impregnated with an aqueous solution comprising a silicone emulsion Rhodorsil EP1 (Rhône-Poulenc) such that about 2% of SiO2 was deposited. The impregnated extrudates are subsequently dried overnight at 120° C. and then calcined at 550° C. for 2 hours in dry air. The catalyst NiMo3Si is thus obtained. Finally, a catalyst NiMoo3BSi was obtained by impregnation of the catalyst NiMo3 with an aqueous solution comprising ammonium diborate and silicone emulsion Rhodorsil EP1 (Rhône-Poulenc). The impregnated extrudates are subsequently dried overnight at 120° C. and then calcined at 550° C. for 2 hours in dry air.

The extrudates of support Z3 of example 1 are also impregnated in the dry state with an aqueous solution of a mixture of ammonium heptamolybdate, nickel nitrate and orthophosphoric acid, dried overnight at 120° C. in air and finally calcined in air at 550° C. The catalyst NiMo3P comprises, in particular, 15.7% by weight of zeolite Y. Analysis of the support by X-ray diffraction shows that it is composed of cubic gamma-alumina of low crystallinity and zeolite Y with a unit cell parameter of 2.444 nm and a global SiO2/Al2O3 ratio of 6.7 and a skeleton SiO2/Al2O3 ratio of 14.7.

We impregnated the sample of catalyst NLMo3P with an aqueous solution comprising ammonium diborate and silicone emulsion Rhodorsil EP1 (Rhône-Poulenc) such that a catalyst NiMo3PBSi comprising phosphorus, boron and silicon was obtained. The other stages of the procedure are the same as those indicated above. The characteristics of the NiMo3 catalysts are summarized in table 1.

TABLE 1

Characteristics of the NiMo3 and NiMo5 catalysts

| Catalyst | NiMo3 | NiMo3Si | NiMo3BSi | NiMo3PBSi | NiMo5 | NiMo5P |
|---|---|---|---|---|---|---|
| $MoO_3$ (% by weight) | 13.1 | 12.8 | 12.5 | 12.1 | 15.2 | 14.6 |
| NiO (% by weight) | 2.84 | 2.8 | 2.7 | 2.6 | 2.8 | 2.7 |
| $P_2O_5$ (% by weight) | 0 | 0 | 0 | 5.0 | 0 | 4.6 |
| $B_2O_3$ (% by weight) | 0 | 0 | 2.4 | 2.3 | 0 | 0 |
| $SiO_2$ total (% by weight) | 13.6 | 15.5 | 15.1 | 14.5 | 6.1 | 5.8 |
| $Al_2O_3$ total (% by weight) | 70.46 | 68.9 | 67.3 | 63.5 | 75.9 | 72.3 |
| Y (% by weight) | 16.6 | 16.2 | 15.8 | 14.9 | 7.1 | 6.7 |

The extrudates of support Z5 comprising a small amount of non-dealuminized zeolite Y with a unit cell parameter equal to 2.444 nm, a global $SiO_2/Al_2O_3$ ratio equal to 6.7 and a skeleton $SiO_2/Al_2O_3$ ratio of 14.1 of example 3 are impregnated in the dry state with an aqueous solution of a mixture of ammonium heptamolybdate and nickel nitrate, dried overnight at 120° C. in air and finally calcined in air at 550° C. The weight contents of oxides of the catalyst NiMo5 obtained are indicated in table 1. The catalyst NiMo5 comprises, in particular, 7.1% by weight of zeolite Y with a unit cell parameter of 2.443 nm and a global $SiO_2/Al_2O_3$ ratio of 6.8 and a skeleton $SiO_2/Al_2O_3$ ratio of 14.9.

The extrudates of support Z5 comprising a zeolite Y of example 1 are also impregnated in the dry state with an aqueous solution of a mixture of ammonium heptamolybdate, nickel nitrate and orthophosphoric acid, dried overnight at 120° C. in air and finally calcined in air at 550° C. The weight contents of oxides of the catalyst NiMo5P obtained are indicated in table 1.

EXAMPLE 3
Preparation of Hydrocracking Catalysts Comprising a Non-dealuminized Zeolite Y and an Element of Group VB (According to the Invention)

The extrudates of support Z3 comprising a non-dealuminized zeolite Y of example 1 are impregnated with an aqueous solution of niobium oxalate $Nb(HC_2O_4)_5$, oxalic acid and ammonium oxalate. The aqueous solution comprising the niobium is prepared from 1,330 ml water, in which 33 g oxalic acid, 37.2 g ammonium oxalate and 92.3 g niobium oxalate are dissolved. To prepare the solution, in a first step a mixture of oxalic acid and ammonium oxalate is dissolved, and when the solution is clear the said solution is heated to 55° C. and the niobium oxalate is added. The solution is then topped up with water to give 1,330 ml of solution. Support Z3 of example 1 above is impregnated by the said method with excess solution. The 1,330 ml of solution are brought into contact with 380 g of catalyst. This allows about 5% by weight of Nb to be deposited on support Z3. After two hours, the extrudates are collected. These are subsequently dried overnight at 120° C. in a stream of dry air and then calcined at 500° C. in dry air for 2 hours. The precursor NbZ3 is thus obtained. The same procedure is followed with support Z5 of example 1 to give the precursor NbZ5.

The two precursors NbZ3 and NbZ5 comprising niobium prepared above are impregnated in the dry state with an aqueous solution of a mixture of ammonium heptamolybdate and nickel nitrate, dried overnight at 120° C. in air and finally calcined in air at 550° C. The weight contents of oxides of the catalysts NbNiMo3 and NbNiMo5 obtained are indicated in table 2.

The catalyst NbNiMo3 is then impregnated with an aqueous solution comprising a silicone emulsion Rhodorsil EP1 (Rhône-Poulenc). The impregnated extrudates are subsequently dried overnight at 120° C. and then calcined at 550° C. for 2 hours in dry air. The catalyst NbNiMo3Si is thus obtained.

Finally, a catalyst NbNiMo3BSi was obtained by impregnation of the catalyst NbNiMo3 with an aqueous solution comprising ammonium diborate and silicone emulsion Rhodorsil EP1(Rhône-Poulenc) such that about 2% of $B_2O_3$ and 2% of $SiO_2$ were deposited. The impregnated extrudates are subsequently dried overnight at 120° C. and then calcined at 550° C. for 2 hours in dry air.

The supports NbZ3 and NbZ5 containing niobium prepared above are impregnated in the dry state with an aqueous solution of a mixture of ammonium heptamolybdate, nickel nitrate and orthophosphoric acid, dried overnight at 120° C. in air and finally calcined in air at 550° C. The weight contents of oxides of the catalyst NbNiMo5P obtained are indicated in table 2.

We impregnated the sample of the catalyst NbNiMo3P with an aqueous solution comprising ammonium diborate and the silicone emulsion Rhodorsil EP1 (Rhône-Poulenc) such that the catalyst NbNiMo3PBSi was obtained. After maturation at room temperature in an atmosphere saturated with water, the impregnated extrudates are dried overnight at 120° C. and then calcined at 550° C. for 2 hours in dry air.

TABLE 2

Characteristics of the NbNiMo3 and NbNiMo5 catalysts

| Catalyst | NbNiMo3 | NbNiMo3Si | NbNiMo3BSi | NbNiMo3PBSi | NbNiMo5 | NbNiMo5P |
|---|---|---|---|---|---|---|
| $Nb_2O_5$ (% by weight) | 5.1 | 5.0 | 5.0 | 5.0 | 5.2 | 5.1 |
| $MoO_3$ (% by weight) | 12.5 | 12.1 | 11.9 | 11.2 | 14.4 | 13.8 |

TABLE 2-continued

Characteristics of the NbNiMo3 and NbNiMo5 catalysts

| Catalyst | NbNiMo3 | NbNiMo3Si | NbNiMo3BSi | NbNiMo3PBSi | NbNiMo5 | NbNiMo5P |
|---|---|---|---|---|---|---|
| NiO (% by weight) | 2.7 | 2.6 | 2.6 | 2.4 | 2.6 | 2.5 |
| $P_2O_5$ (% by weight) | 0 | 0 | 0 | 4.7 | 0 | 4.4 |
| $B_2O_3$ (% by weight) | 0 | 0 | 2.3 | 2.1 | 0 | 0 |
| $SiO_2$ total (% by weight) | 13.65 | 15.5 | 15.1 | 14.5 | 5.8 | 5.6 |
| $Al_2O_3$ total (% by weight) | 66.1 | 64.8 | 63.1 | 60.1 | 72.0 | 68.6 |
| Y (% by weight) | 15.7 | 15.4 | 15.0 | 14.1 | 6.7 | 6.4 |

EXAMPLE 4

Comparison of Catalysts in Hydrocracking of a Vacuum Gas Oil Under Low Pressure

The catalysts for which the preparations are described in the preceding examples are used under hydrocracking conditions at moderate pressure on a petroleum feed of which the main characteristics are as follows:

| | |
|---|---|
| Density (20/4) | 0.921 |
| Sulphur (% by weight) | 2.46 |
| Nitrogen (ppm by weight) | 1,130 |
| Simulated distillation | |
| Initial point | |
| 10% point | 365° C. |
| 50% point | 430° C. |
| 90% point | 472° C. |
| Final point | 504° C. |
| Pour point | 539° C. |
| | +39° C. |

The catalytic test unit comprises two fixed bed reactors with ascending circulation of the feed ("up-flow"). 40 ml catalyst are introduced into each of the reactors. The catalyst of the first hydrotreatment stage HTH548 marketed by the company Procatalyse and comprising an element of group VI and an element of group VIII deposited on alumina is introduced into the first reactor, that in which the feed passes first. The hydrocracking catalyst (NiMo5 series) is introduced into the second reactor, in which the feed passes last. The two catalysts are subjected to an in situ sulphurization stage before the reaction. Once the sulphurization has been carried out, the feed described above can be converted. The total pressure is 8.5 MPa, the hydrogen flow rate is 500 liters of gaseous hydrogen per liter of feed injected, and the hourly volume velocity is 0.8 h$^{-1}$. The two reactors function at the same temperature.

The catalytic performances are expressed by the crude conversion at 400° C. (CC), by the crude selectivity for middle distillates (150–380° C. cut) (CS) and by the hydrodesulphurization (HDS) and hydrodenitrogenation (HDN) conversions. These catalytic performances are measured on the catalyst after a stabilization period, in general at least 48 hours, has been observed.

The gross conversion GC is equal to:

$GC$=% by weight of $380^{below}$ of the effluent

The fraction $380^{below}$ of the effluent indicates the portion of the effluent which boils below 380° C.

The gross selectivity GS is equal to:

$GS$=100*weight of the fraction (150° C.–380° C.)/weight of the fraction $380^{below}$ of the effluent The hydrodesulphurization conversion HDS is equal to:

$HDS=(S_{initial}-S_{effluent})/S_{initial}*100=(24{,}600-S_{effluent})/24{,}600*100$ The hydrodenitrogenation conversion HDN is equal to:

$HDN=(N_{initial}-N_{effluent})/N_{initial}*100=(1{,}130-N_{effluent})/1130*100$ In the following table 3, we have shown the gross conversion GC at 400° C., the gross selectivity GS, the hydrodesulphurization conversion HDS and the hydrodenitrogenation conversion HDN for the catalysts of the invention which were tested.

TABLE 3

Catalytic activities of the catalysts in partial hydrocracking at 400° C.

| | GC (% by weight) | GS (%) | HDS (%) | HDN (%) |
|---|---|---|---|---|
| NiMo3 | 50.9 | 79.8 | 98.9 | 97.1 |
| NbNiMo3Si | 52.9 | 79.4 | 99.0 | 97.3 |
| NbNiMo3BSi | 55.5 | 79.3 | 99.5 | 98.9 |
| NbNiMo3PBSi | 55.7 | 79.2 | 99.45 | 98.9 |

The results of table 3 show that the performances of the NiMo3 catalysts are greatly improved if they comprise niobium and a promoter. An improvement in the crude conversion while maintaining a constant selectivity in middle distillates is found in particular.

Catalysts comprising a zeolite not globally deluminized and an element of group VB and a promoter element are thus of particular interest for partial hydrocracking of a feed of the vacuum distillate type comprising nitrogen under a moderate hydrogen pressure.

EXAMPLE 5

Comparison of Catalysts in Hydrocracking of a Vacuum Gas Oil Under a Hither Pressure The catalysts for which the preparations are described in the preceding examples 3 and 4 are used under the conditions of hydrocracking under elevated pressure (12 MPa) on a petroleum feed of which the main characteristics are as follows:

| | |
|---|---|
| Density (20/4) | 0.919 |
| Sulphur (% by weight) | 2.46 |
| Nitrogen (ppm by weight) | 930 |

-continued

| Simulated distillation | |
|---|---|
| Initial point | 277° C. |
| 10% point | 381° C. |
| 50% point | 482° C. |
| 90% point | 531° C. |
| Final point | 545° C. |
| Pour point | +39° C. |

The catalytic test unit comprises two fixed bed reactors with an ascending circulation of the feed ("up-flow"). 40 ml of catalyst are introduced into each of the reactors. The catalyst of the first hydrotreatment stage HR360 marketed by the company Procatalyse and comprising an element of group VI and an element of group VIII deposited on alumina is introduced into the first reactor, that in which the feed passes first. The catalyst of the second stage, that is to say the hydroconversion catalyst (NiMo5 series), is introduced into the second reactor, that in which the feed passes last. The two catalysts are subjected to an in situ sulphurization stage before the reaction. Once the sulphurization has been carried out, the feed described above can be converted. The total pressure is 12 MPa, the hydrogen flow rate is 1,000 liters of gaseous hydrogen per liter of feed injected, and the hourly volume velocity is 0.9 $h^{-1}$.

The catalytic performances are expressed by the temperature which allows a crude conversion level of 70% to be reached and by the gross selectivity in middle distillates (150° C.–380° C. cut). The catalytic performances are measured on the catalyst after a stabilization period, in general at least 48 hours, has been observed.

The gross conversion GC is equal to:

$GC=\%$ by weight of $380^{below}$ of the effluent to:

The gross selectivity GS is equal to:

$GS=100*$weight of the fraction (150° C.–380° C.)/weight of the fraction $380^{below}$ of the effluent.

The temperature of the reaction is fixed such that a gross conversion GC equal to 70% by weight is achieved. In the following table 4, we have shown the reaction temperature and the crude selectivity for the catalysts of the NiMo5 series.

TABLE 4

Catalytic activities of NiMo5 catalysts in hydrocracking

| | T (° C.) | GS (%) |
|---|---|---|
| NiMo5 | 396 | 71 |
| NiMo5P | 395 | 71.4 |
| NbNiMo5P | 392 | 71.3 |

The presence of an element of group VB, here niobium, and of a promoter in the catalyst comprising zeolite not globally deluminized allows the very high selectivity of the NiMo5 catalyst to be preserved, while having a lower reaction temperature, since a gain in temperature of 4° C. is observed.

The catalysts of the invention comprising a zeolite not globally dealuminized, an element of group VB and a promoter are thus of particular interest for hydrocracking of a feed of the vacuum distillate type comprising nitrogen under a moderate and elevated hydrogen pressure.

What is claimed is:

1. In a process comprising catalytically hydrocracking a hydrocarbon feed, the improvement wherein the catalyst comprises at least one amorphous or poorly crystallized matrix of the oxide type, niobium, at least zeolite Y not globally dealuminized, having a unit cell parameter which is greater than 2.438 nm and a global SiO2/Al2O3 ratio of less than 8, at least one element chosen from the group VIB and at least one element chosen from group VIII, and at least one promoter element which is or phosphorus.

2. A process according to claim 1, in which the zeolite Y has a skeleton molar $SiO_2/Al_2O_3$ ratio greater than or equal to the global molar ratio and less than about 21.

3. A process according to claim 1, in which the element of group VIB is molybdenum or tungsten and the element of group VIII is iron, cobalt or nickel.

4. A process according to claim 1, also comprising at least one element chosen from group VIIA.

5. A process according to claim 1, comprising, in % by weight with respect to the total weight of the catalyst:
   0.1 to 99.8% of at least one zeolite Y not globally dealuminized,
   0.1 to 60% of niobium
   0.1 to 99% of at least one amorphous or poorly crystallized porous mineral matrix of the oxide type
   0.1 to 20% of at least one promoter element chosen from the group consisting of boron, phosphorus and silicon, not including the silicon optionally contained in the zeolite, it being possible for the catalyst also to comprise:
   0.1 to 50% of at least one element chosen form the elements of group VIB and group VIII and
   0 to 20% of at least one element chosen from group VIIA.

6. A process according to claim 1 wherein the catalyst is prepared by a process comprising:
   a) a solid called the precursor and comprising at least the following compounds is dried and weighed: at least one matrix, at least one zeolite Y not globally dealuminized, optionally at least one promoter element chosen from the group consisting of boron, phosphorus and silicon, at least one element chosen from the group VIB and at least one element chosen from the group VIII, and optionally at least one element of group VIIA,
   b) the dry solid obtained in stage a) is calcined at a temperature of at least 150° C.,
   c) the precursor solid defined in stage b) is impregnated with a solution comprising niobium,
   d) the moist solid is left to stand in a damp atmosphere at a temperature of between 10 and 120° C.,
   e) the moist solid obtained in step (d) is dried at a temperature of between 60 and 150° C.,
   f) the dried solid of stage e) is calcined in dry air at a temperature of at least 150° C.

7. A process according to claim 6, in which at least one calcination is carried out at the end of any one of the preparation stages at a temperature of at least 150° C.

8. A process according to claim 6, in which the catalyst is sulfurized under a stream of a hydrogen/hydrogen sulphide mixture or under pure hydrogen sulphide at a temperature of between 150 and 800° C.

9. A process according to claim 1, in which the temperature is greater than 200° C., the pressure is greater than 0.1 MPa, the amount of hydrogen is at least 50 liters of hydrogen per liter of feed, and the hourly volume velocity is between 0.1 and 20 volumes of feed per volume of catalyst and per hour.

10. A process according to claim 1, in which the conversion level is less than 55%, the temperature is greater than 230° C., the pressure is greater than 2 Mpa and less than 12 Mpa, the amount of hydrogen is at least 100 liters of hydrogen per liter of feed, and the hourly volume velocity is between 0.15 and 10 volumes of feed per volume of catalyst and per hour.

11. A process according to claim 1, in which the conversion is greater than 55%, the temperature is greater tan 230° C., the pressure is greater than 5 MPa, the amount of hydrogen is at least 100 liters of hydrogen per liter of feed, and the hourly volume velocity is between 0.15 and 10 volumes of feed per volume of catalyst and per hour.

12. A process according to claim 1, in which a hydrotreatment stage is carried out at a temperature between 350° C. and 460° C., a pressure of at least 2 MPa, with an amount of hydrogen of at least 100 liters of hydrogen per liter of feed and an hourly volume velocity of between 0.1 and 5 volumes of feed per volume of catalyst and per hour, and prior to the hydrodcracking stage.

13. A process according to claim 6 wherein step (f) is conducted at a temperature of at least 250° C.

14. A process according to claim 2, also comprising at least one element chosen form group VIIA.

15. A process according to claim 2, said catalyst further comprising a group VIB element selected from the group consisting of molybdenum and tungsten, a group VIII element selected from the group consisting of iron, cobalt and nickel; and fluorine.

16. In a process comprising catalytically hydrocracking a hydrocarbon feed, the improvement wherein the catalyst comprises at least one amorphous or poorly crystallized matrix of the oxide type, niobium, at least zeolite Y not globally dealuminized, having a unit cell parameter which is greater than 2.438 nm and a global $SiO_2/Al_2O_3$ ratio of less than 8, at least one element chosen from the group VIB and at least one element chosen from the group VIII, and at least one promoter element comprising boron and phosphorous.

17. The process according to claim 5, wherein 0.1 to 40% of at least one element is chosen from the groups VIB and VIII.

18. The process according to claim 5, wherein 0.1 to 15% of at least one element is chosen from group VIIA.

19. The process according to claim 5, wherein 0.1 to 10% of at least one element is chosen from group VIIA.

* * * * *

UNITED STATES PATENT AND TRADEMARK OFFICE
CERTIFICATE OF CORRECTION

PATENT NO. : 6,500,330 B2  
DATED : December 31, 2002  
INVENTOR(S) : Slavik Kasztelan et al.

It is certified that error appears in the above-identified patent and that said Letters Patent is hereby corrected as shown below:

Column 18,  
Line 9, reads "is or" should read -- is boron or --  
Line 31, reads "chosen form the" should read -- chosen from the --

Column 19,  
Line 3, reads "2 Mpa" should read -- 2 Mpa --  
Line 4, reads "Mpa," should read -- Mpa, --  
Line 9, reads "greater tan" should read -- greater than --  
Line 20, reads "hydrodcracking" should read -- hydrocracking --  
Line 24, reads "chosen form the" should read -- chosen from the --

Signed and Sealed this

Third Day of August, 2004

JON W. DUDAS  
*Acting Director of the United States Patent and Trademark Office*